United States Patent
Wang et al.

(10) Patent No.: US 9,251,778 B2
(45) Date of Patent: Feb. 2, 2016

(54) METAL FOIL WITH MICROCRACKS, METHOD OF MANUFACTURING THE SAME, AND SOUND-ABSORBING STRUCTURE HAVING THE SAME

(71) Applicant: Industrial Technology Research Institute, Hsinchu (TW)

(72) Inventors: Shang-Chih Wang, Taichung (TW); Shen Tsao, Hsinchu (TW); Yu-Tsung Chiu, Taipei (TW); Chun-Ti Chen, Hsinchu (TW); Yu-Yang Su, New Taipei (TW); Mu-Hsi Sung, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/583,204

(22) Filed: Dec. 26, 2014

(65) Prior Publication Data
US 2015/0356962 A1 Dec. 10, 2015

(30) Foreign Application Priority Data

Jun. 6, 2014 (TW) .............................. 103119773 A
Dec. 12, 2014 (TW) .............................. 103143503 A

(51) Int. Cl.
*F02K 1/38* (2006.01)
*G10K 11/00* (2006.01)

(52) U.S. Cl.
CPC ....... *G10K 11/002* (2013.01); *Y10T 428/12361* (2015.01)

(58) Field of Classification Search
CPC ...................................................... F02K 1/38
USPC ................................................. 181/220, 286
See application file for complete search history.

(56) References Cited

U.S. PATENT DOCUMENTS

| 4,515,840 A | 5/1985 | Gatward |
| 4,931,166 A | 6/1990 | Ramshaw |
| 5,004,526 A | 4/1991 | Ramshaw |
| 5,701,736 A | 12/1997 | Morishima et al. |

(Continued)

FOREIGN PATENT DOCUMENTS

| AU | 2425501 | 6/2001 |
| AU | 2002333791 | 3/2003 |

(Continued)

OTHER PUBLICATIONS

Guo Tiankui, "Advances in the study of microperforated-panel acoustic absorber," China Building Materials Science & Technology, vol. 18, Issue 4, Jul.-Aug. 2009, pp. 84-88.

(Continued)

*Primary Examiner* — Forrest M Phillips
(74) *Attorney, Agent, or Firm* — Jianq Chyun IP Office

(57) ABSTRACT

A method of manufacturing a metal foil with microcracks includes placing a metal foil between a first material sheet and a second material sheet and then rolling them to form a plurality of microcracks in the metal foil. The microcracks are penetrating, and a sidewall of each of the microcracks is an irregular rough surface. Two ends of each of the microcracks are acute angles. A sound-absorbing structure includes at least one metal foil and a base plate kept at a distance from the metal foil, wherein at least one resonant cavity air layer is formed between the metal foil and the base plate by the distance, and the metal foil has microcracks.

18 Claims, 8 Drawing Sheets

(I)

(II)

(III)

(56) References Cited

U.S. PATENT DOCUMENTS

| | | | |
|---|---|---|---|
| 5,873,242 | A | 2/1999 | Morishima et al. |
| 7,105,127 | B2 | 9/2006 | Vatchiants |
| 7,291,815 | B2 | 11/2007 | Hubert et al. |
| 7,654,364 | B2 | 2/2010 | Yamaguchi et al. |
| 7,838,125 | B2 | 11/2010 | Pelzer et al. |
| 7,884,038 | B2 | 2/2011 | Roding |
| 7,923,668 | B2 | 4/2011 | Layland et al. |
| 8,007,615 | B2 | 8/2011 | Sadlier |
| 8,061,476 | B2 | 11/2011 | Corin |
| 8,113,217 | B2 | 2/2012 | Grzonka |
| 8,770,344 | B2 | 7/2014 | Borroni |
| 2006/0138039 | A1 | 6/2006 | Rudolf et al. |
| 2007/0036979 | A1 | 2/2007 | Roding |
| 2007/0235253 | A1* | 10/2007 | Hiraku et al. ............... 181/293 |
| 2008/0135332 | A1 | 6/2008 | Ueda et al. |
| 2008/0264720 | A1* | 10/2008 | Vigran et al. ............... 181/286 |
| 2009/0042824 | A1 | 2/2009 | van Bilsen et al. |
| 2009/0050404 | A1 | 2/2009 | Corin |
| 2009/0183807 | A1 | 7/2009 | Sadlier |
| 2009/0197044 | A1 | 8/2009 | Pelzer et al. |
| 2009/0210103 | A1 | 8/2009 | Cook |
| 2010/0096580 | A1 | 4/2010 | Daschkeit |
| 2010/0178531 | A1 | 7/2010 | Amaratunga et al. |
| 2010/0178568 | A1 | 7/2010 | Unalan et al. |
| 2010/0216023 | A1 | 8/2010 | Wei et al. |
| 2010/0319840 | A1 | 12/2010 | Sadlier |
| 2011/0048850 | A1 | 3/2011 | Alexander et al. |
| 2011/0217517 | A1* | 9/2011 | McMillan et al. ............ 428/155 |
| 2011/0265539 | A1 | 11/2011 | Lu |
| 2012/0034431 | A1 | 2/2012 | Caprioli et al. |
| 2012/0107428 | A1 | 5/2012 | Schneidmiller et al. |

FOREIGN PATENT DOCUMENTS

| | | |
|---|---|---|
| AU | 2006223685 | 9/2006 |
| CN | 102016194 | 4/2011 |
| CN | 202163052 | 3/2012 |
| CN | 202319107 | 7/2012 |
| CN | 102639795 | 8/2012 |
| CN | 103003871 | 3/2013 |
| CN | 103726581 | 4/2014 |
| CN | 103727075 | 4/2014 |
| CN | 203546929 | 4/2014 |
| CN | 203559963 | 4/2014 |
| CN | 203565150 | 4/2014 |
| CN | 203569715 | 4/2014 |
| EP | 0060047 | 9/1982 |
| EP | 1100700 | 5/2001 |
| EP | 1650137 | 4/2006 |
| EP | 2053176 | 4/2009 |
| EP | 2188187 | 5/2010 |
| EP | 2503040 | 9/2012 |
| JP | 2006199276 | 8/2006 |
| JP | 2007156309 | 6/2007 |
| JP | 2014048632 | 3/2014 |
| KR | 20140036783 | 3/2014 |
| TW | 200610857 | 4/2006 |
| TW | 201030220 | 8/2010 |
| TW | 201129476 | 9/2011 |
| WO | 9723350 | 7/1997 |
| WO | 0006422 | 2/2000 |
| WO | 0138073 | 5/2001 |
| WO | 03021096 | 3/2003 |
| WO | 2006019318 | 2/2006 |
| WO | 2006045542 | 5/2006 |
| WO | 2006098694 | 9/2006 |
| WO | 2009023469 | 2/2009 |
| WO | 2009131855 | 10/2009 |
| WO | 2009137466 | 11/2009 |
| WO | 2010049743 | 5/2010 |
| WO | 2010081769 | 7/2010 |
| WO | 2010081770 | 7/2010 |
| WO | 2010112354 | 10/2010 |
| WO | 2012021531 | 2/2012 |
| WO | 2014048632 | 4/2014 |
| WO | 2014123313 | 8/2014 |

OTHER PUBLICATIONS

Ming-Han Wu, "A Study of Sound Absorption Characteristics on Perforated Steel Panel," Thesis for Master of Science, Department of Architecture, National Cheng Kung University, Jul. 2003.

Chih-Wei Lin, "Acoustic Absorption Characteristics of Composite Perforated plates with Porous Material," Thesis for Master of Science, Department of Mechanical Engineering, Tatung University, Jul. 2004.

Andrew Kennedy, "Porous Metals and Metal Foams Made from Powders," Powder Metallurgy, Mar. 2012, pp. 31-46.

John Banhart, "Manufacture, characterisation and application of cellular metals and metal foams," Progress in Materials Science, vol. 46, Issue 6, Nov.-Dec. 2001, pp. 559-632.

I. Made Miasa, et al., "An Experimental Study of a Multi-Size Microperforated Panel Absorber," Journal of System Design and Dynamics, vol. 1, Issue 2, Jan. 2007, pp. 331-339.

Ke Liu, et al., "One of Ideal Absorbing Materials in Architectural Acoustics: Micro-Perforated Panel Absorbers," The Journal of the Acoustical Society of America, vol. 119, No. 5, Jan. 2006, pp. 197-202.

Jorge P. Arenas, et al., "Recent Trends in Porous Sound-Absorbing Materials," Sound & Vibration, Jul. 2010, pp. 12-17.

David Herrin, et al., "Properties and Applications of Microperforated Panels," Sound & Vibration, Jul. 2011, pp. 6-9.

Toshimitsu Tanaka, et al., "New Technologies for Noise Reduction of Environment along High Speed Surface Transportation," Kobe Steel Engineering Reports, vol. 57, No. 1, Apr. 2007, pp. 36-42.

* cited by examiner (I)

(II)

(III)

METAL FOIL WITH MICROCRACKS, METHOD OF MANUFACTURING THE SAME, AND SOUND-ABSORBING STRUCTURE HAVING THE SAME

CROSS-REFERENCE TO RELATED APPLICATION

This application claims the priority benefit of Taiwan application serial no. 103119773, filed on Jun. 6, 2014 and Taiwan application serial no. 103143503, filed on Dec. 12, 2014. The entirety of each of the above-mentioned patent applications is hereby incorporated by reference herein and made a part of this specification.

TECHNICAL FIELD

The disclosure relates to a metal foil with microcracks, a method of manufacturing the same, and a sound-absorbing structure having the same.

BACKGROUND

The sound-absorbing principle of a micro-perforation plate states that the sound wave would loss energy due to resonant friction generated after the sound wave penetrates the micro-perforation, and therefore energy loss of the sound wave occurs due to the friction. According to the micro-perforation principle, when the aperture of a perforation is less than 1 mm, the perforation has better sound-absorbing performance, and the smaller the aperture the better. A fiber sound-absorbing material is flammable and not friendly to environment, and a stone sound-absorbing material is heavy. In comparison with above two materials, the micro-perforation plate has lightweight and environmental advantages, but it is difficult to manufacture thin and porous metal foil material having good sound-absorbing function, and the cost is high.

SUMMARY

One of the present embodiments comprises a method of manufacturing a metal foil with microcracks. The method includes placing a metal foil between a first and a second material sheets, wherein the ductility of each of the first and second material sheets is higher than the ductility of the metal foil. The first and second material sheets and the metal foil therebetween are rolled, and then the first and second material sheets are removed so as to obtain a metal foil having many microcracks.

Another of the present embodiments comprises a metal foil having penetrating microcracks. The sidewalls of the microcracks are irregular rough surfaces, and two ends of the microcracks are acute angles.

Yet another of the present embodiments comprises a sound-absorbing structure having a metal foil with microcracks. The sound-absorbing structure includes at least one metal foil and a base plate kept at a distance from the metal foil, wherein at least one resonant cavity air layer is formed between the metal foil and the base plate by the distance.

In order to make the aforementioned features of the disclosure more comprehensible, embodiments accompanied with figures are described in detail below.

DETAILED DESCRIPTION OF DISCLOSED EMBODIMENTS

Figure 1:
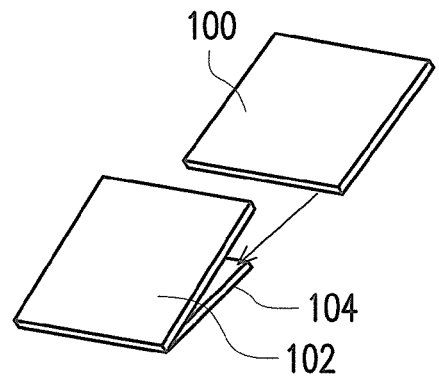
FIG. 1 is a schematic of a manufacturing process of a metal foil having microcracks according to an embodiment of the disclosure.
Figure 1:
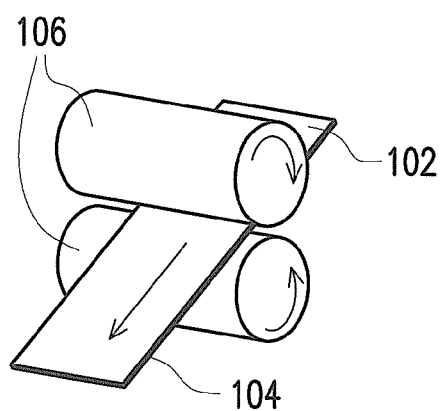
Figure 1:
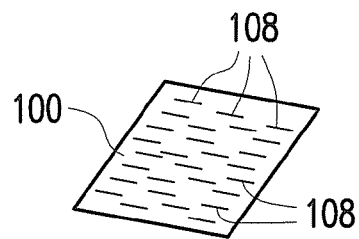

FIG. 1 is a schematic of a manufacturing process of a metal foil having microcracks according to an embodiment of the disclosure.

Referring to section (I) of FIG. 1, first, a metal foil 100 is placed between first and second material sheets 102 and 104, wherein the ductility of each of the first and second material sheets 102 and 104 is higher than the ductility of the metal foil 100. For instance, the material of the metal foil 100 can be pure copper, pure aluminum, pure titanium, carbon steel, alloy steel, stainless steel, copper alloy, aluminum alloy, nickel-based alloy, or titanium alloy; and the material of the first and second material sheets 102 and 104 can be pure copper, pure aluminum, pure titanium, carbon steel, alloy steel, stainless steel, copper alloy, aluminum alloy, nickel-based alloy, or titanium alloy. Although the materials can be the same, during selection, the principle that the ductility of each of the first and second material sheets 102 and 104 is higher than the ductility of the metal foil 100 needs to be followed. Moreover, the first and second material sheets 102 and 104 can also be two material sheets for which the edges are connected or folded single material sheets.

Then, referring to section (II) of FIG. 1, the first and second material sheets 102 and 104 and the metal foil (not shown) therebetween are rolled. After rolling with a pair of rollers 106, since the ductility of the metal foil 100 is worse than the ductility of each of the material sheets 102 and 104 in the upper and lower layers, an elongated crack is naturally generated in the metal foil 100 from the influence of tensile strain.

Moreover, according to the needed number of microcracks, the reduction ratio of the rolling thickness and the number of rolling can be adjusted. For instance, rolling once or a plurality of times may be both possible.

Then, referring to section (III) of FIG. 1, after the first and second material sheets 102 and 104 of section (III) are removed, the metal foil 100 having many microcracks 108 can be obtained.

Figure 2:
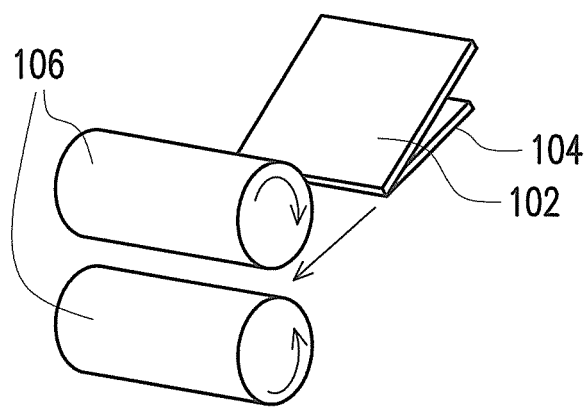
FIG. 2 is a schematic of a manufacturing process of FIG. 1 before step (I).

In another embodiment, before the step of section (I), the first and second material sheets 102 and 104 may be stacked on each other and optionally rolled by the pair of rollers 106, as shown in FIG. 2.

A plurality of experimental examples is provided below to verify the efficacy of the disclosure. However, the disclosure is not limited thereto.

Experimental Example 1

304 stainless steel foils having thicknesses of 0.02 mm and 0.03 mm were placed between pure copper sheets having different thicknesses, and then rolling was performed via a roller having a diameter of 105 mm. Detailed rolling data are shown in Table 1 below. Microcracks are generated on the stainless steel foils after rolling, as shown in the SEM photographs of FIG. 3 and FIG. 4. It can be observed from the SEM pictures of FIG. 3 (Table 1 No. 1) and FIG. 4 (Table 1 No. 5) that the stainless steel foils have a plurality of microcracks. Due to lattice arrangement and orientation in the metal foils (such as the 304 stainless steel foils of experimental example 1), microcracks are generated between layered (grain) structures having different orientations in the metal foils during the rolling process due to tensile stress.

Since the metal foil manufactured in the disclosure not only has a penetrating microcrack, but a sidewall thereof also has an irregular rough surface generated from ductile deformation fracture, the metal foil has excellent sound-absorbing effect.

Figure 8:
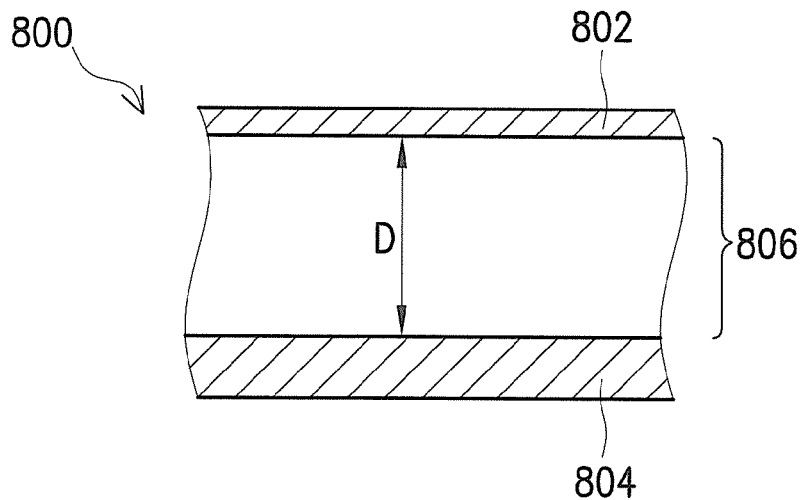
FIG. 8 is a cross-sectional schematic of a sound-absorbing structure including a metal foil according to another embodiment of the disclosure.

FIG. 8 is a cross-sectional schematic of a sound-absorbing structure including a metal foil according to another embodiment of the disclosure.

In FIG. 8, a sound-absorbing structure 800 includes the metal foil 802 made in the above embodiments and a base plate 804 kept at a distance D from the metal foil 802, wherein a resonant cavity air layer 806 is formed between the metal foil 802 and the base plate 804 by the distance D. The base plate 804 is capable of reflective, and it is, for instance, a case body having an opening. The metal foil 802 is disposed at the opening and kept at the distance D from the bottom surface of the case body. However, the disclosure D is not limited thereto, and any base plate 804 capable of keeping the distance D from the metal foil 802 is suitable for the present embodiment. The effect of the sound-absorbing structure 800 is verified later with experimental example 2.

Experimental Example 2

The stainless steel microcrack foil obtained in experimental example 1 (No. 1) was used as 802 of FIG. 8, and a perforated plate (aperture: 2 mm/perforated rate: 8.7%, NRC 0.065) made from a regular nonporous 304 stainless steel foil having a thickness of 0.02 mm and an aluminum plate having a thickness of 0.6 mm was used as 804 of FIG. 8. 802 and 804 were integrated into the sound-absorbing structure of FIG. 8, and the resonant cavity air layer was about 3 cm (i.e., distance

TABLE 1

| No. | Dimension of stainless steel foil (length × width × thickness, mm) | Dimension of copper sheet (length × width × thickness, mm) | Overall thickness, reduction ratio (%) | Elongation rate in length of copper sheet (%) | Rolling load (ton) | Microcrack |
|---|---|---|---|---|---|---|
| 1 | 147 × 150 × 0.02 | 346 × 150 × 0.309 | 18 | 116 | 18 | Yes |
| 2 | 147 × 150 × 0.03 | 290 × 150 × 0.348 | 16 | 119 | 20.2 | Yes |
| 3 | 150 × 150 × 0.03 | 150 × 150 × 1 | 16 | 179 | 4.8 | Yes |
| 4 | 150 × 150 × 0.03 | 150 × 150 × 1 | 17 | 177 | 3.5 | Yes |
| 5 | 150 × 150 × 0.02 | 150 × 150 × 1 | 17 | 135 | 4.3 | Yes |

Figure 3:
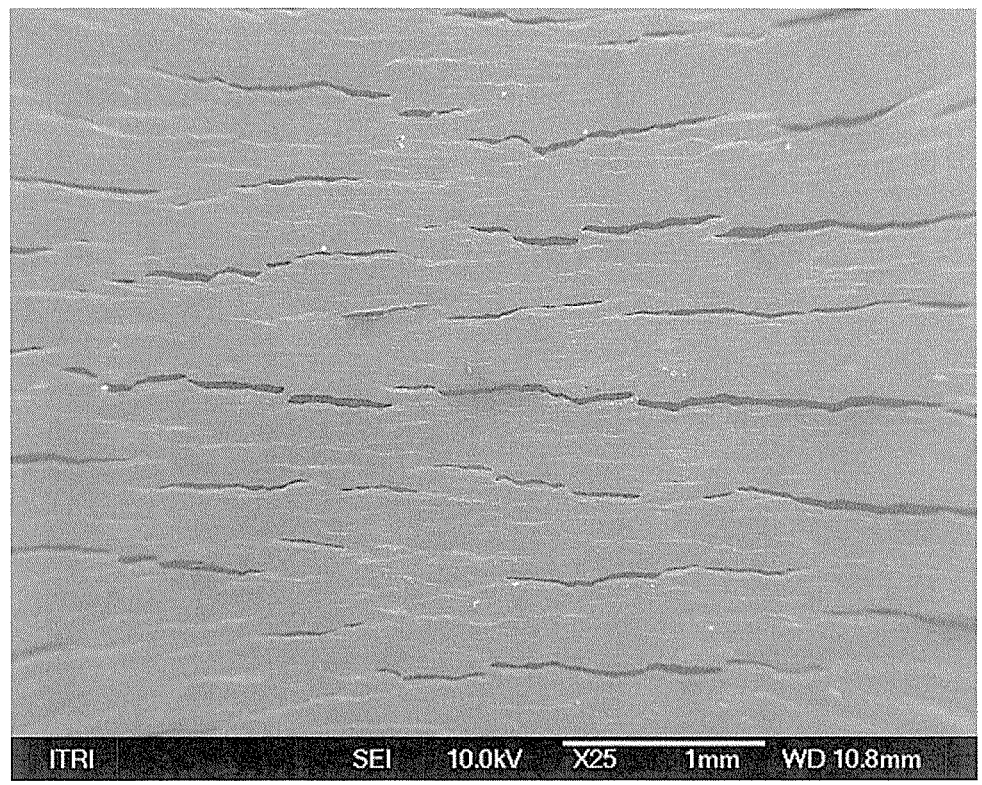
FIG. 3 and FIG. 4 are SEM photographs of a stainless steel foil having microcracks obtained under two different conditions in experimental example 1.
Figure 4:
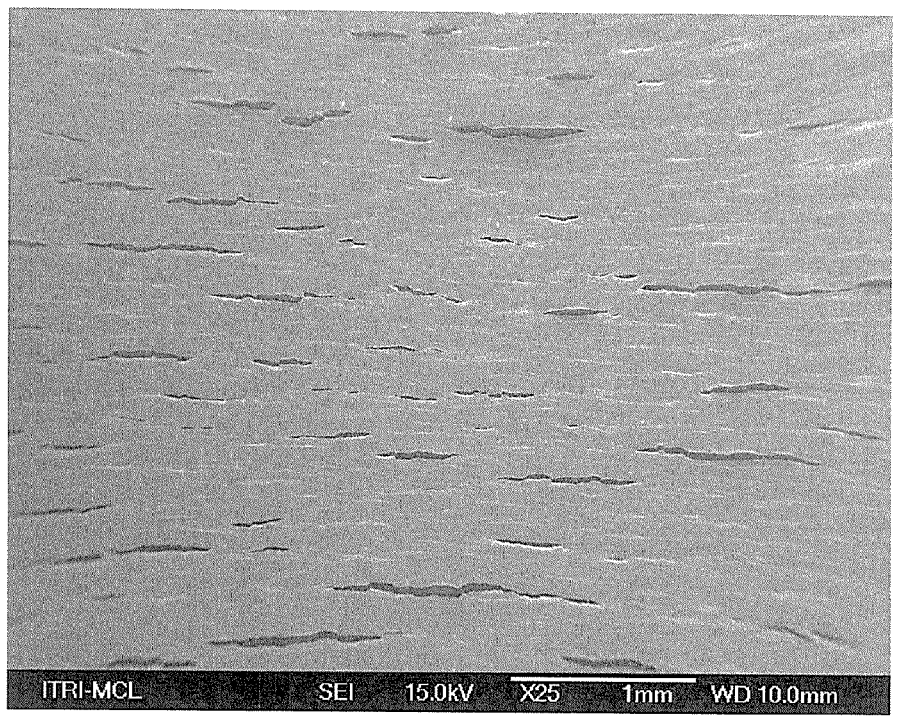
Figure 5:
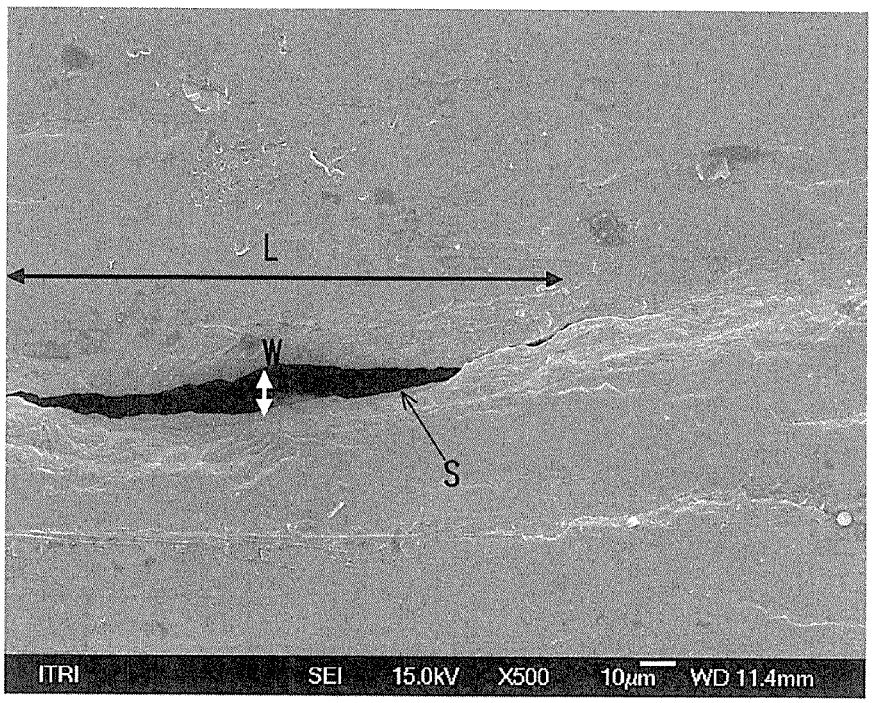
FIG. 5 is an SEM photograph of an enlarged portion of FIG. 3.

Microcracks are generated on the stainless steel foils after rolling, as shown in the SEM photographs of FIG. 3 and FIG. 4. By seeing the SEM pictures of FIG. 3 (Table 1 No. 1) and FIG. 4 (Table 1 No. 5), it can be estimated that the number of microcracks per unit area thereof are respectively about 3,510,000/m$^2$ and about 4,650,000/m$^2$. Moreover, it can be observed from FIG. 5 enlarged from FIG. 3 that a sidewall S of the microcrack is obviously an irregular rough surface, and two ends of the microcrack are acute angle such as slits.

Figure 6A:
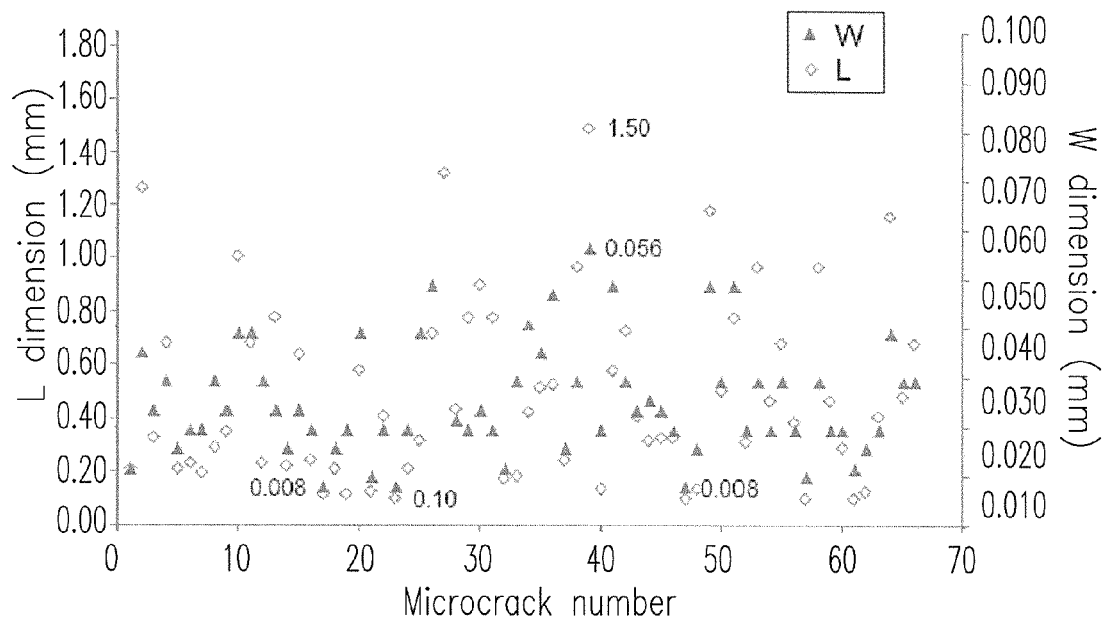
FIG. 6A is a curve diagram of the size distribution of microcracks of a stainless steel foil of Table 1 No. 1.
Figure 7A:
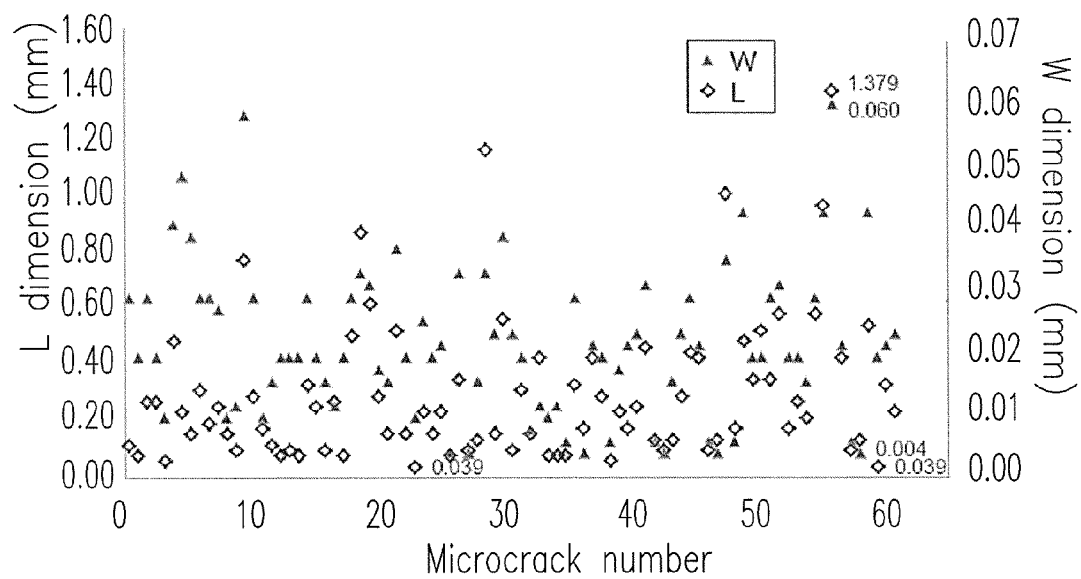
FIG. 7A is a curve diagram of the size distribution of microcracks of a stainless steel foil of Table 1 No. 5.

By examining the SEM pictures of FIG. 3 (Table 1 No. 1) and FIG. 4 (Table 1 No. 5), the size of each of a length L and a maximum opening width W of each of the microcracks can be obtained, which are respectively made into FIG. 6A and FIG. 7A.

Figure 6B:
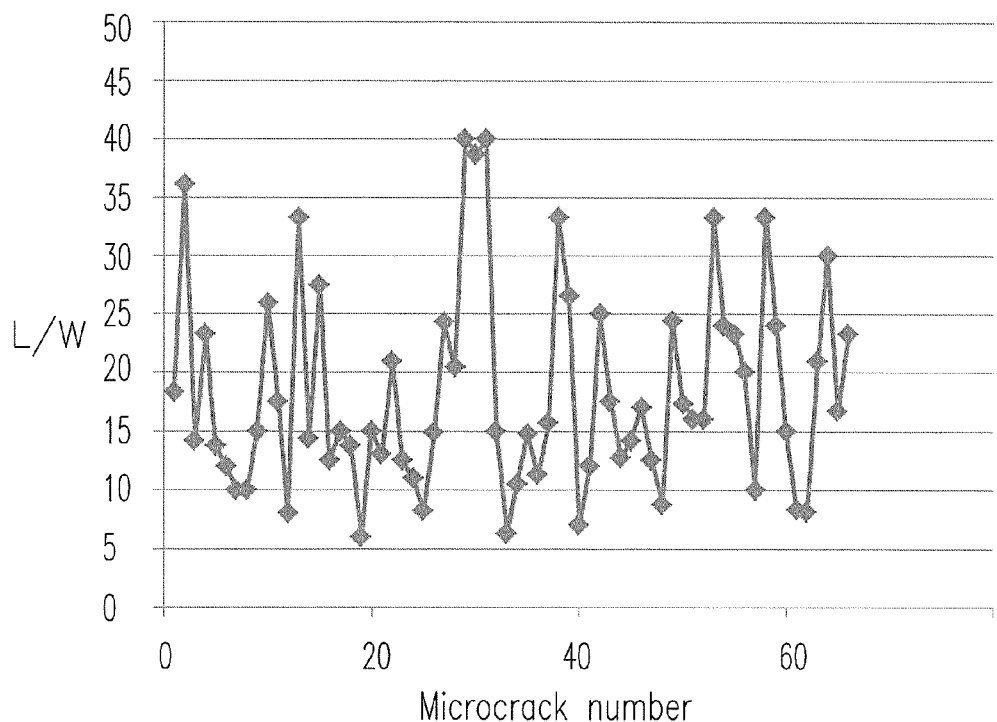
FIG. 6B is a curve diagram of the relationship of the length and the maximum opening width of the microcracks of the stainless steel foil of Table 1 No. 1.
Figure 7B:
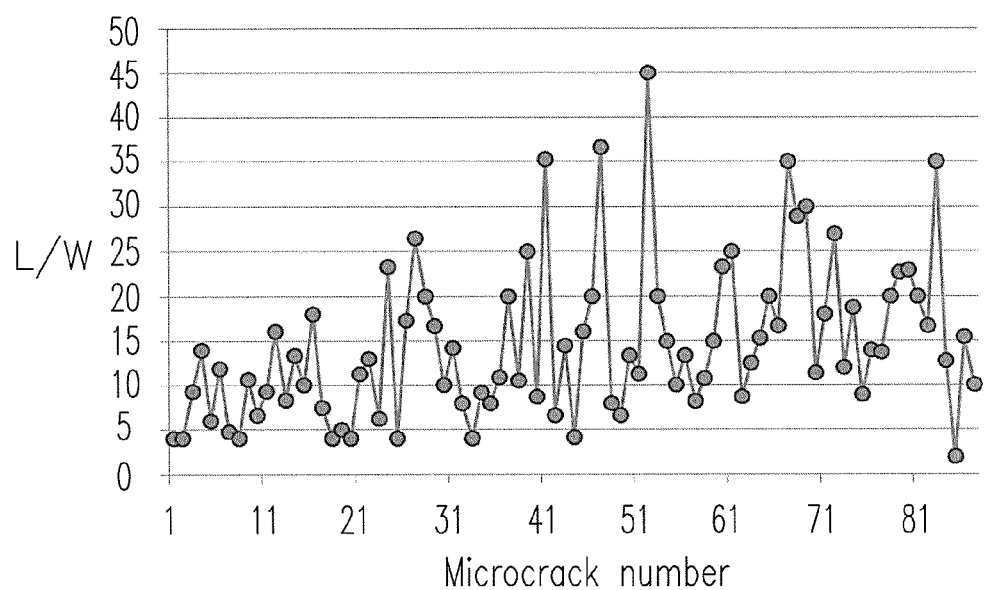
FIG. 7B is a curve diagram of the relationship distribution of the length and the maximum opening of the microcracks of the stainless steel foil of Table 1 No. 5.

In experimental example 1, the length L of the microcrack ranges, for instance, from 0.039 mm to 1.5 mm; and the maximum opening width W of the microcrack ranges, for instance, from 0.004 mm to 0.06 mm. The ratios of the length L and the maximum opening width W of the microcrack in No. 1 and No. 5 of Table 1 are also respectively made into FIG. 6B and FIG. 7B, and it can be obtained from the figures that L/W ranges from about 1 to about 50, such as 2 to 45.

D=3 cm). Then, the sound absorption testing was performed according to ASTM E1050 to obtain a graph of the relationship of forward incidence sound absorption coefficient and sound frequency, as shown in FIG. 9.

Figure 9:
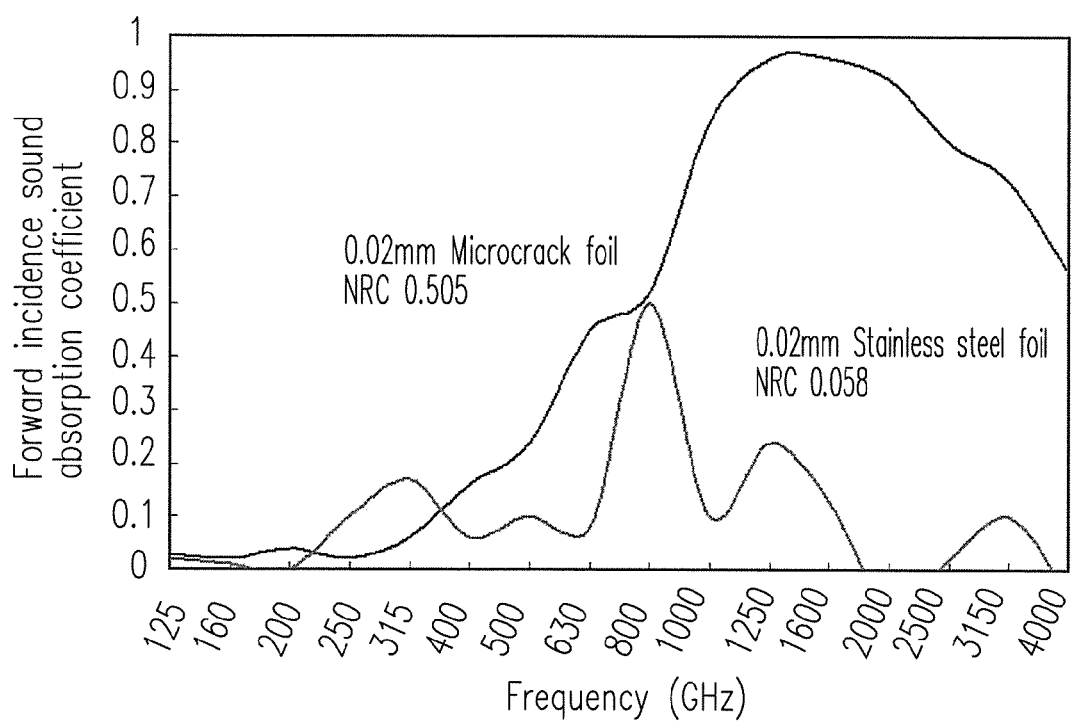
FIG. 9 is a curve diagram of the test results of a forward sound absorption coefficient of experimental example 2.

It can be known from FIG. 9 that, the stainless steel foil (metal foil) having microcracks of experimental example 1 all have sound-absorbing effect from 125 Hz to 4,000 Hz. The noise reduction coefficient (NRC) was measured to be 0.505, and the maximum sound-absorbing coefficient is 0.96 @ 1250 Hz to 1600 Hz. In comparison, the NRC of the nonporous 304 stainless steel is only 0.058.

Figure 10:
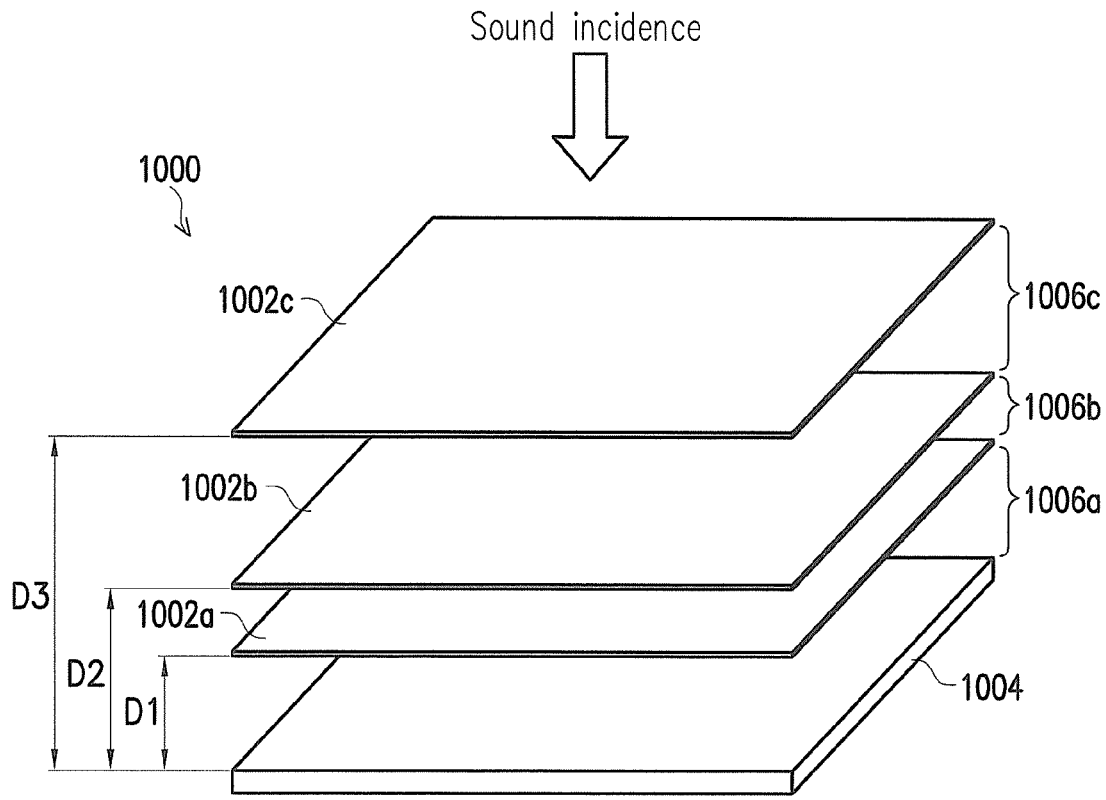
FIG. 10 is a three-dimensional schematic of a sound-absorbing structure including a plurality of metal foils according to another embodiment of the disclosure.

FIG. 10 is a three-dimensional schematic of a sound-absorbing structure including a plurality of metal foils according to another embodiment of the disclosure.

In FIG. 10, a sound-absorbing structure 1000 includes a plurality of metal foils 1002a-c manufactured according to the above embodiments. The sound-absorbing structure 1000 also includes a base plate 1004. The metal foils 1002a-c are respectively kept at distances D1, D2, and D3 from the base plate 1004, and a plurality of resonant cavity air layers 1006a-c is thereby formed therebetween. The metal foils 1002*a-c* should not be close compacted to form the necessary cavity air layers 1006*a-c*. For example, the metal foils 1002*a-c* may be superposed and spaced out a distance apart so as to form the sound-absorbing structure including the metal foils 1002*a-c*. The base plate 1004 is, for instance, a case body having an opening, and the metal foils 1002*a-c* are disposed at the opening and kept at distances D1, D2 and D3 from the bottom surface of the case body. However, the disclosure is not limited thereto, and any base plate 1004 capable of keeping a distance from the plurality of metal foils 1002*a-c* is suitable for the present embodiment. Moreover, the number of the metal foils and the distances are not limited to 3 as this figure, and can be designed according to different requirements.

Experimental Example 3

Figure 11:
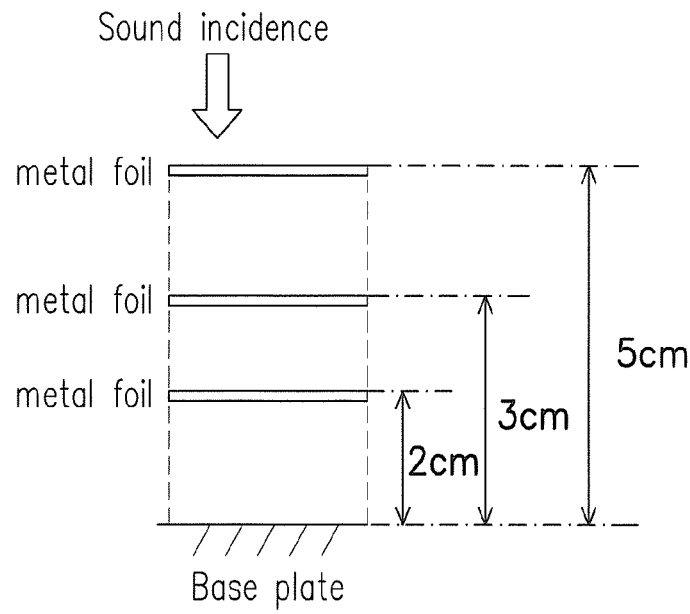
FIG. 11 is a schematic of a sound-absorbing structure of experimental example 3.
Figure 12A:
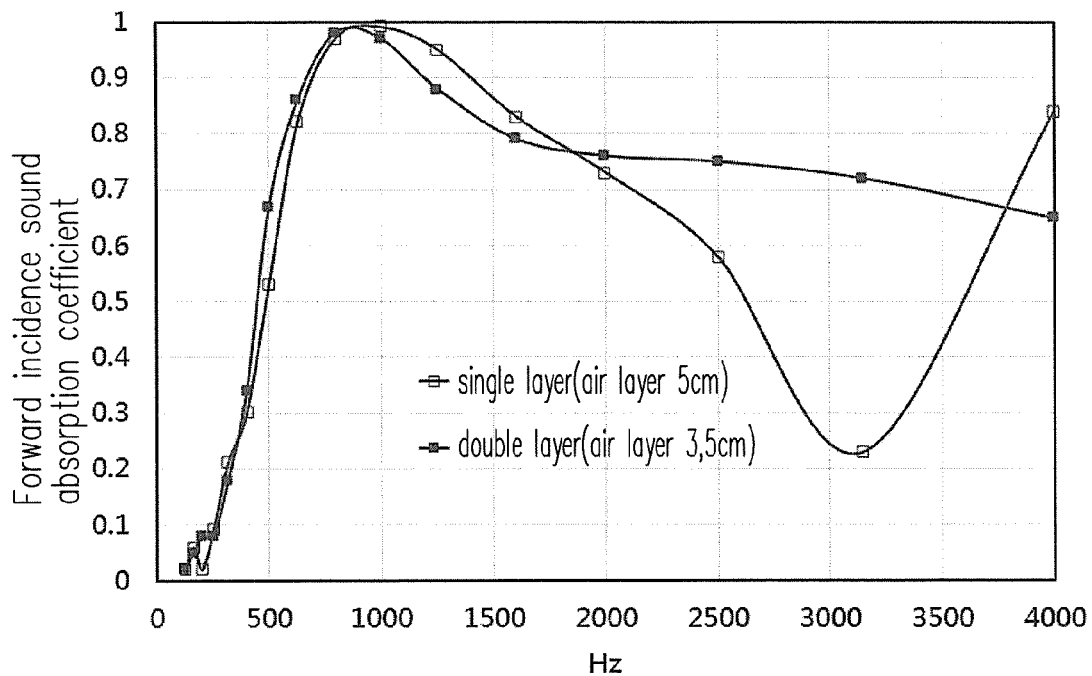
FIG. 12A is a curve diagram of the test results of a forward sound absorption coefficient of sound-absorbing structures with single-layer metal foil and double-layer metal foil at different heights of the resonant cavity air layers.
Figure 12B:
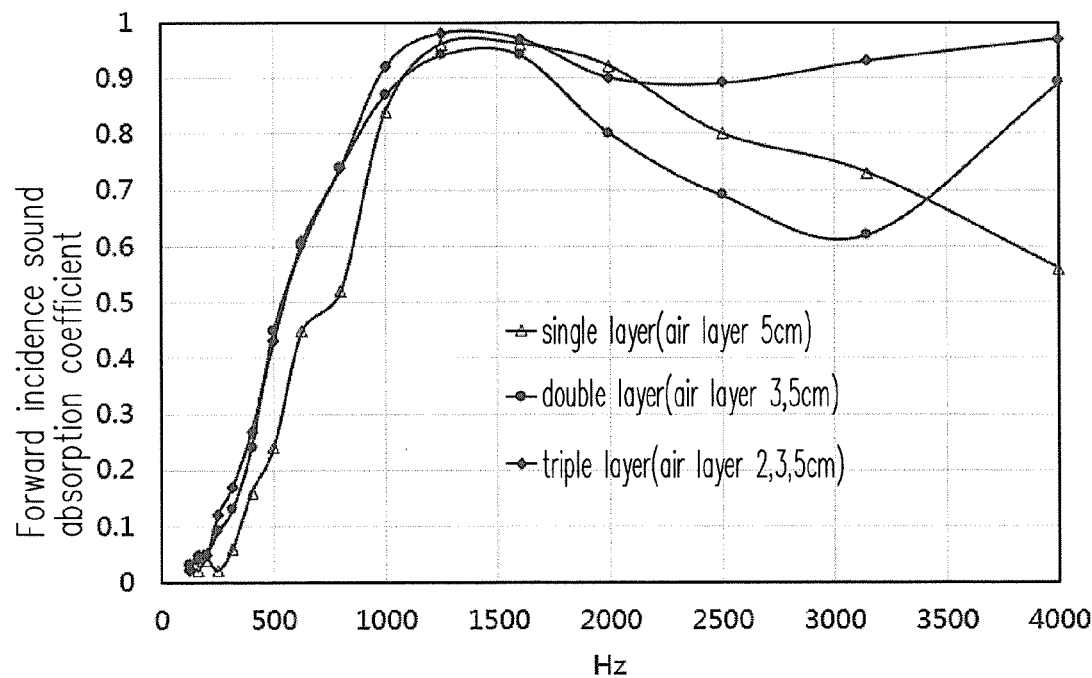
FIG. 12B is a curve diagram of the test results of a forward sound absorption coefficient of sound-absorbing structures with single-layer, double-layer and triple-layer metal foils at different heights of the resonant cavity air layers.

According to the sound-absorbing structure of FIG. 10, a sound-absorbing structure having a plurality of metal foils is shown in FIG. 11. The sound-absorbing structure is made by superimposing several 0.02 mm-thick stainless steel foils (i.e., metal foils) with microcracks. Then, tests were performed to obtain a graph of a forward sound absorption coefficient of sound-absorbing structures with single-layer metal foil and double-layer metal foil as shown in FIG. 12A, and a graph of a forward sound absorption coefficient of sound-absorbing structures with single-layer, double-layer and triple-layer metal foils as shown in FIG. 12B. The two experimental results show that the sound-absorbing structure with several layers of metal foil has broader absorption frequency and better sound-absorbing effect than the sound-absorbing structure with single-layer metal foil.

Based on the above, in the disclosure, by controlling the method of deformation via multi-layer rolling, microcracks distributed over a large area are foil ied on a metal foil, and the metal foil obtained according to the manufacturing process has functions such as sound absorption and filtering. In the disclosure, the number of layers of the metal foil and the distance from the resonant cavity air layer can be designed according to the characterized sound frequency and bandwidth that measured from noise source, so as to form a sound-absorbing structure.

What is claimed is:

1. A method of manufacturing a metal foil with microcracks, comprising:
   placing a metal foil between a first material sheet and a second material sheet, wherein a ductility of each of the first and second material sheets is higher than that of the metal foil;
   rolling the first material sheet, the second material sheet, and the metal foil between the first and second material sheets; and
   removing the first material sheet and the second material sheet to obtain a metal foil having a plurality of microcracks.

2. The method of claim 1, wherein a material of the metal foil comprises pure copper, pure aluminum, pure titanium, carbon steel, alloy steel, stainless steel, copper alloy, aluminum alloy, nickel-based alloy, or titanium alloy.

3. The method of claim 1, wherein a material of the first and second material sheets independently comprises pure copper, pure aluminum, pure titanium, carbon steel, alloy steel, stainless steel, copper alloy, aluminum alloy, nickel-based alloy, or titanium alloy.

4. The method of claim 1, before the step of placing the metal foil between the first material sheet and the second material sheet, further comprising rolling the first and second material sheets stacked on each other.

5. The method of claim 1, wherein the first material sheet and the second material sheet is two material sheets for which the edges are connected or folded single material sheets.

6. A metal foil, comprising a plurality of microcracks, wherein
   the microcracks are penetrating,
   a sidewall of each of the microcracks is an irregular rough surface, and
   two ends of each of the microcracks are acute angles.

7. The metal foil of claim 6, wherein a ratio of a length to a maximum opening width of each of the microcrack is between 1 and 50.

8. The metal foil of claim 6, wherein a length of each of the microcrack is from 0.039 mm to 1.5 mm.

9. The metal foil of claim 6, wherein a maximum opening width of each of the microcrack is from 0.004 mm to 0.06 mm.

10. The metal foil of claim 6, wherein a material of the metal foil comprises pure copper, pure aluminum, pure titanium, carbon steel, alloy steel, stainless steel, copper alloy, aluminum alloy, nickel-based alloy, or titanium alloy.

11. A sound-absorbing structure having a metal foil with microcracks, comprising: at least one metal foil and a base plate kept at a distance from the metal foil, wherein at least one resonant cavity air layer is formed between the metal foil and the base plate by the distance.

12. The sound-absorbing structure having a metal foil with microcracks of claim 11, wherein the base plate comprises a reflective base plate.

13. The sound-absorbing structure having a metal foil with microcracks of claim 11, wherein the base plate comprises a case body having an opening, and the metal foil is disposed at the opening and is kept at the distance from a bottom surface of the case body.

14. The sound-absorbing structure having a metal foil with microcracks of claim 11, wherein the base plate comprises a case body having an opening, the metal foil comprises more than one layer, and the metal foils are disposed at the opening and are respectively kept at a plurality of distances from a bottom surface of the case body.

15. The sound-absorbing structure having a metal foil with microcracks of claim 11, wherein the metal foil has a plurality of penetrating microcracks, and
   a sidewall of each of the microcracks is an irregular rough surface; and
   two ends of each of the microcracks are acute angles.

16. The sound-absorbing structure having a metal foil with microcracks of claim 15, wherein a ratio of a length and a maximum opening width of each of the microcracks is between 1 and 50.

17. The sound-absorbing structure having a metal foil with microcracks of claim 15, wherein a length of each of the microcracks is between 0.039 mm and 1.5 mm.

18. The sound-absorbing structure having a metal foil with microcracks of claim 15, wherein a maximum opening width of each of the microcracks is between 0.004 mm and 0.06 mm.

* * * * *